(12) United States Patent
Martí Sala et al.

(10) Patent No.: US 9,586,768 B2
(45) Date of Patent: Mar. 7, 2017

(54) APPARATUS FOR POSITIONING CONTAINERS

(71) Applicants: Jaime Martí Sala, Barcelona (ES); Alex Martí Mercadé, Sant Cugat del Vallès (ES)

(72) Inventors: Jaime Martí Sala, Barcelona (ES); Alex Martí Mercadé, Sant Cugat del Vallès (ES)

( * ) Notice: Subject to any disclaimer, the term of this patent is extended or adjusted under 35 U.S.C. 154(b) by 0 days.

(21) Appl. No.: 15/097,410

(22) Filed: Apr. 13, 2016

(65) Prior Publication Data
US 2016/0297622 A1 Oct. 13, 2016

(30) Foreign Application Priority Data
Apr. 10, 2015 (EP) .................................... 15380012

(51) Int. Cl.
| | |
|---|---|
| *B65G 47/24* | (2006.01) |
| *B65G 47/68* | (2006.01) |
| *B65G 29/00* | (2006.01) |
| *B65G 47/84* | (2006.01) |
| *B65G 47/14* | (2006.01) |

(52) U.S. Cl.
CPC ........... *B65G 47/681* (2013.01); *B65G 29/00* (2013.01); *B65G 47/1457* (2013.01); *B65G 47/24* (2013.01); *B65G 47/846* (2013.01); *B65G 2201/0244* (2013.01)

(58) Field of Classification Search
CPC ........ B65G 17/32; B65G 47/24; B65G 47/14; B65G 47/12; B65G 47/1457; B65G 47/1464

USPC .. 198/384, 383, 382, 400, 397, 392, 397.02, 198/393
See application file for complete search history.

(56) References Cited

U.S. PATENT DOCUMENTS

| | | | |
|---|---|---|---|
| 3,276,564 A | * | 10/1966 | Seragnoli ................ B65B 35/08 198/392 |
| 5,197,586 A | | 3/1993 | Marti Sala |
| 5,297,666 A | | 3/1994 | Marti Sala |

(Continued)

FOREIGN PATENT DOCUMENTS

| | | |
|---|---|---|
| EP | 2226277 B1 | 9/2010 |
| ES | 2332006 T3 | 3/2007 |

OTHER PUBLICATIONS

U.S. Appl. No. 15/044,780, filed Feb. 16, 2016, Marti Sala, Jaime et al.

*Primary Examiner* — James R Bidwell
(74) *Attorney, Agent, or Firm* — Robert J. Hess; Hess Patent Law Firm

(57) ABSTRACT

Apparatus for positioning containers houses containers (5) upright in lower and upper compartment sections (12, 13) vertically aligned with one another on a periphery of a conveyor device (10) and has a transfer wheel (31) extracting containers (5) from both lower and upper compartments (12, 13) on two levels and an intercalation wheel (32) extracting containers from the upper level of the transfer wheel (31), dropping them to a lower level over the course of one turn, and placing them again on the lower level of the transfer wheel (31) in an intercalated position between the containers (5) previously transferred to the lower level, and all the containers (5) are transferred from the lower level of the transfer wheel (31) to an output conveyor (8).

20 Claims, 6 Drawing Sheets

(56) References Cited

U.S. PATENT DOCUMENTS

| | | | |
|---|---|---|---|
| 5,415,322 A * | 5/1995 | Sala | B65G 47/1457 198/392 |
| 5,549,189 A * | 8/1996 | Martisala | B65G 47/1457 198/380 |
| 5,769,203 A | 6/1998 | Marti Sala | |
| 5,984,079 A * | 11/1999 | Garcia | G01R 31/013 198/392 |
| 6,033,156 A | 3/2000 | Marti Sala | |
| 6,065,587 A * | 5/2000 | Schindel | B65G 47/1457 198/392 |
| 6,079,546 A | 6/2000 | Marti Sala | |
| 6,116,406 A | 9/2000 | Marti Sala | |
| 6,435,333 B1 | 8/2002 | Sala | |
| 6,457,610 B1 | 10/2002 | Marti Sala | |
| 6,494,646 B1 | 12/2002 | Sala | |
| 6,557,691 B2 * | 5/2003 | Ronchi | B65G 47/1457 198/397.02 |
| 7,134,540 B1 | 11/2006 | Marti Sala | |
| 7,258,222 B2 | 8/2007 | Marti Sala et al. | |
| 7,374,032 B2 | 5/2008 | Marti Sala et al. | |
| 7,950,517 B2 | 5/2011 | Marti Sala et al. | |
| 8,051,971 B2 | 11/2011 | Marti Sala | |
| 8,096,403 B2 | 1/2012 | Marti Sala et al. | |
| 8,701,865 B2 * | 4/2014 | Forni | B65G 11/203 198/384 |
| 8,739,961 B2 | 6/2014 | Marti Sala et al. | |
| 8,978,869 B2 * | 3/2015 | Schombert | B65G 47/1464 198/392 |
| 2004/0011623 A1 | 1/2004 | Sala | |
| 2006/0124432 A1 | 6/2006 | Marti Sala et al. | |
| 2006/0182610 A1 | 8/2006 | Sala et al. | |
| 2006/0243563 A1 | 11/2006 | Marti Sala | |
| 2008/0060912 A1 | 3/2008 | Marti Sala et al. | |
| 2008/0296127 A1 | 12/2008 | Marti Sala et al. | |
| 2008/0314717 A1 | 12/2008 | Marti Sala et al. | |
| 2009/0120765 A1 | 5/2009 | Marti Sala | |
| 2009/0283384 A1 | 11/2009 | Marti Sala et al. | |
| 2012/0024672 A1 | 2/2012 | Marti Sala et al. | |

* cited by examiner

APPARATUS FOR POSITIONING CONTAINERS

TECHNICAL FIELD

The present invention generally relates to an apparatus for positioning containers, and more particularly to an apparatus for positioning empty containers, which are initially randomly scrambled, upright on their bases and forming a row on a conveyor device.

BACKGROUND OF THE INVENTION

Document ES 2332006 T3 discloses an apparatus for positioning containers which in one of its embodiments comprises a conveyor device, a loading device, an intercalation wheel and a transfer wheel. The conveyor device has on its periphery a plurality of alignment compartments and auxiliary compartments rotating in a circular path, where each alignment compartment comprises a lower compartment section and an upper compartment section vertically aligned with one another, and where the auxiliary compartments are fixed to the conveyor device in intercalated positions between the lower compartment sections. Each of the lower and upper compartment sections and each auxiliary compartment are sized for housing a container upright on its base. The loading device is configured for taking containers from a receptacle where the containers are randomly scrambled and individually placing them upright on their bases in the lower and upper compartment sections of the alignment compartments. The intercalation wheel is configured and arranged for extracting containers from the upper compartment sections of the alignment compartments, dropping them to a lower level over the course of one turn of the intercalation wheel and placing them again in the auxiliary compartments. The transfer wheel is located on one side of the conveyor device opposite the intercalation wheel and is configured for extracting containers from the lower compartment sections and from the auxiliary compartments of the conveyor device and transferring them to the output conveyor.

For the purpose of obtaining relatively high productivity in apparatuses of this type the conveyor device is usually provided with a relatively large perimetric length for the purpose of housing the highest possible number of alignment compartments on its periphery, and accordingly the fact that the apparatus described in said patent document ES 2332006 T3 includes a plurality of auxiliary compartments intercalated between the lower compartment sections is a drawback since it makes it necessary to incorporate in the conveyor device the same number of auxiliary compartments as alignment compartments, which considerably increases manufacturing costs, as well as the weight and inertia of the conveyor device.

On the other hand, the fact that the intercalation wheel and the transfer wheel in the apparatus described in the mentioned patent document ES 2332006 T3 are located on opposite sides of the conveyor device is a drawback since this makes it necessary for a worker responsible for supervision tasks during operation of the apparatus to continuously go from one side of the apparatus to the other to supervise operation of the intercalation wheel and operation of the transfer wheel.

BRIEF DESCRIPTION OF THE INVENTION

The present invention provides an apparatus for positioning containers comprising a conveyor device, a loading device, a transfer wheel and an intercalation device.

The conveyor device has alignment compartments moving along a closed circuit. Each of these alignment compartments comprises a lower compartment section and an upper compartment section vertically aligned with one another, and each of the lower and upper compartment sections is sized for housing a container upright on its base.

The loading device is configured and arranged for individually loading containers placed upright on their bases inside the lower and upper compartment sections of the alignment compartments.

The transfer wheel is rotational and has on its periphery lower transfer recesses and upper transfer recesses receiving containers from the lower and upper compartment sections, respectively, of the alignment compartments of the conveyor device.

The intercalation device receives the containers from said upper transfer recesses and transfers them to said lower transfer recesses in intercalated positions between the containers previously transferred to the lower transfer recesses of the transfer wheel, from where all the containers are transferred to an output conveyor.

Deflecting elements are arranged such that they transfer containers from the conveyor device to the transfer wheel, from the transfer wheel to the intercalation device, from the intercalation device to the transfer wheel, and from the transfer wheel to said output conveyor.

The intercalation device comprises a rotating intercalation wheel having on its periphery lower intercalation recesses and upper intercalation recesses receiving containers, as well as an intercalation drop site through which the containers fall from the upper intercalation recesses to the lower intercalation recesses over the course of one turn.

Deflecting elements cooperate with said transfer wheel for extracting containers from the lower and upper compartment sections of the conveyor device and transferring them to the lower and upper transfer recesses, respectively.

Other deflecting elements cooperate with said intercalation wheel for extracting containers from the upper transfer recesses of the transfer wheel and transferring them to the upper intercalation recesses of the intercalation wheel, and for extracting containers from the lower intercalation recesses of the intercalation wheel, where they are located after having fallen through the intercalation drop site, and transferring them to the lower transfer recesses of the transfer wheel in intercalated positions between the positions of the containers previously transferred to the lower transfer recesses of the transfer wheel.

Finally, another deflecting element cooperates with the output conveyor for transferring containers from the lower transfer recesses of the transfer wheel to said output conveyor.

Preferably, the alignment compartments are distributed at regular intervals along the periphery of the conveyor device and separated from one another by a distance in a forward movement direction equivalent to one pitch, and the transfer wheel has a number n of upper transfer recesses distributed at regular intervals along its periphery and separated from one another by a distance in a circumferential direction equivalent to the pitch, and a double number 2n of lower transfer recesses distributed at regular intervals along its periphery and separated from one another by a distance in a circumferential direction equivalent to a half pitch, i.e., to one half of the pitch. Each of the upper transfer recesses is vertically aligned with one of the lower transfer recesses.

In one embodiment, the intercalation wheel has an uneven number m of lower intercalation recesses and an equal uneven number m of upper intercalation recesses distributed at regular intervals along its periphery and separated from one another by a distance in a circumferential direction equivalent to the half pitch. Each of the upper intercalation recesses is vertically aligned with one of the lower intercalation recesses. This uneven number m of lower and upper intercalation recesses vertically aligned with one another and separated by a half pitch makes intercalation of the containers in the lower transfer recesses of the transfer wheel possible.

In another embodiment, the intercalation wheel has an even number p of lower intercalation recesses and an equal even number p of upper intercalation recesses distributed at regular intervals along its periphery and separated from one another by a distance in a circumferential direction equivalent to the pitch. The lower intercalation recesses are shifted with respect to the upper intercalation recesses a distance in a circumferential direction equivalent to the half pitch.

To guide the falling of containers from the upper intercalation recesses to the lower intercalation recesses, in this embodiment the intercalation wheel comprises a plurality of drop chutes, each of which has an upper opening arranged for receiving one of the containers falling from one of the upper intercalation recesses through the intercalation drop site and an inclined surface leading the falling container to one of the lower intercalation recesses. The half pitch shift of the lower intercalation recesses with respect to the upper intercalation recesses makes intercalation of the containers in the lower transfer recesses of the transfer wheel possible.

The lower and upper compartment sections of the alignment compartments of the conveyor device, the lower and upper transfer recesses of the transfer wheel, and the lower and upper intercalation recesses of the intercalation wheel are configured in relation to a central axis or central line which in use substantially coincides with a central axis or central line of the containers housed upright on their bases therein.

The expression "vertically aligned with one another" applied to the lower and upper compartment sections of the alignment compartments of the conveyor device, or to lower and upper transfer recesses of the transfer wheel, or to lower and upper intercalation recesses of the intercalation wheel is used to express that central axes or central lines thereof are aligned in a vertical direction.

BRIEF DESCRIPTION OF THE DRAWINGS

The foregoing and other features and advantages will be better understood from the following detailed description of illustrative and non-limiting embodiments with reference to the accompanying drawings, in which.

DETAILED DESCRIPTION OF EXEMPLARY EMBODIMENTS

First in reference to FIGS. 1, 2, 3, 7 and 8, there is shown an apparatus for positioning containers according to an embodiment of the present invention, which essentially comprises a conveyor device 10, a loading device, and a transfer device 30 including a transfer wheel 31 and an intercalation wheel 32.

Figure 2:
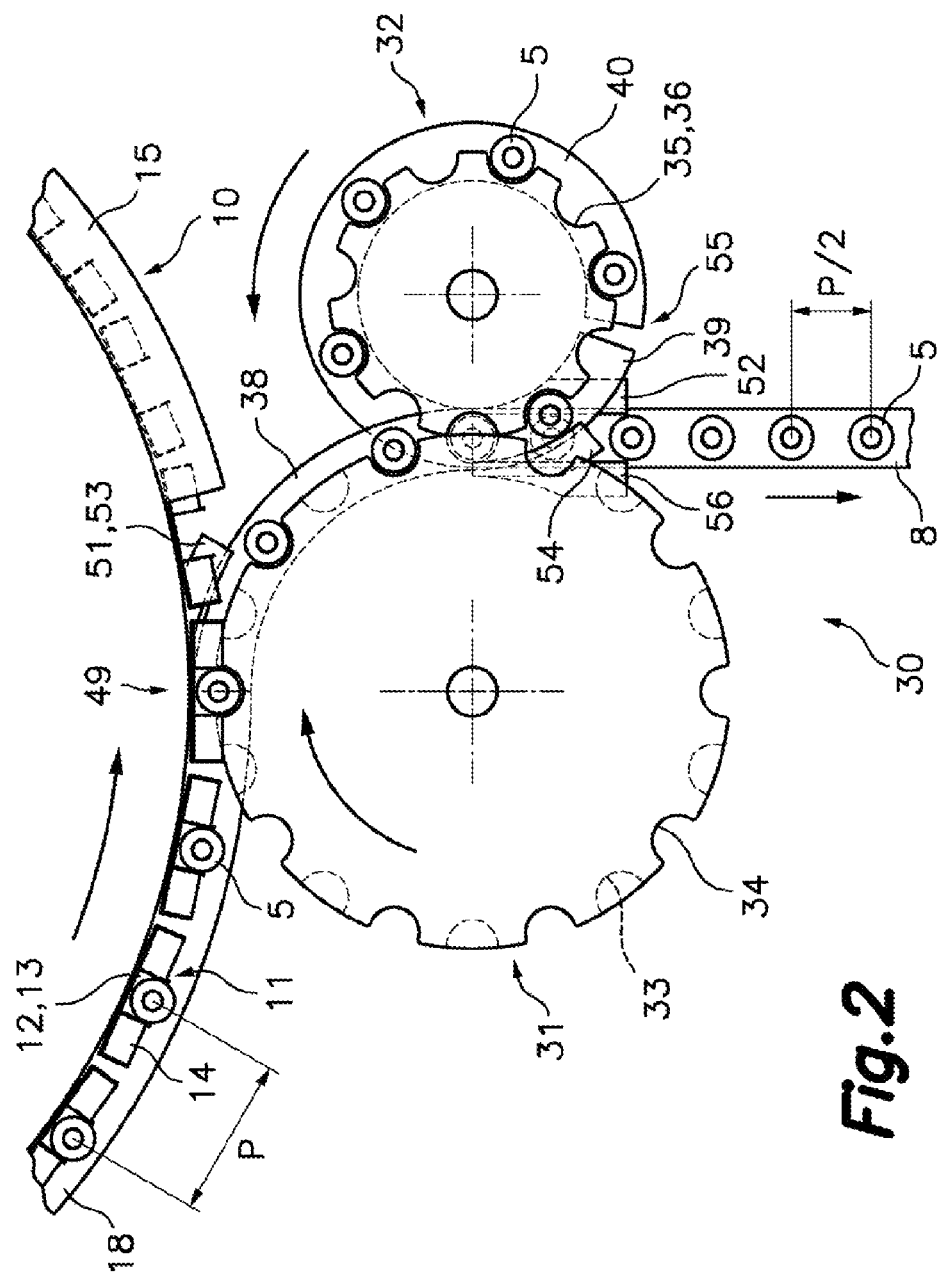
FIG. 2 is a partial schematic plan view showing a transfer device of the apparatus for positioning containers of FIG. 1.

In this embodiment, the conveyor device 10 comprises a structure rotating about a vertical axis and has a plurality of alignment compartments 11 installed on its periphery, such that the alignment compartments 11 rotate together with the conveyor device 10 along a closed circuit defining a circular path. The alignment compartments 11 are distributed at regular intervals along the periphery of the conveyor device 10 and are separated from one another by a distance in a circumferential direction equivalent to one pitch P (FIG. 2). Each alignment compartment 11 comprises a lower compartment section 12, an upper compartment section 13, and an upper inlet section 14 arranged one above the other and aligned in a vertical direction.

Each of the lower and upper compartment sections 12, 13 is sized for housing a container 5 upright on its base and has an open upper end and a lower open end. Each inlet section 14 has an upper opening sized for receiving a container 5 arranged laying on its side, a funnel-shaped drop chute, and a lower opening in communication with the open upper end of the corresponding upper compartment section 13.

First and second stationary positioning support planes 15, 16 are located above the upper openings of the inlet sections 14 of the alignment compartments 11. The first positioning support plane 15 has a final end in the rotating direction of the conveyor device 10 determining a first alignment drop site 19 and the second positioning support plane 16 has a final end in the rotating direction of the conveyor device 10 determining a second alignment drop site 20. Likewise, the first positioning support plane 15 has an initial end located after the second alignment drop site 20 in the rotating direction of the conveyor device 10, and the second positioning support plane 16 has an initial end located after the first alignment drop site 19 in the rotating direction of the conveyor device 10.

The conveyor device 10 further comprises a plurality of peripheral cavities 43 (FIGS. 7 and 8) rotating with conveyor device 10 above the stationary first and second positioning support planes 15, 16. Each of the peripheral cavities 43 has an upper opening and an open bottom and is sized for receiving a container laying on its side oriented in a direction aligned with or tangent to a forward movement direction, either with its base in a front position or with its base in a rear position. The peripheral cavities 43 include retaining elements 44 configured for supporting a prominent portion of the container 5, such as for example a neck of the container 5, whether the container 5 is oriented with its base in a front position or in a rear position.

A stationary lower support plane 17 is arranged below the open lower ends of the lower compartment sections 12 of the alignment compartments 11, and a stationary upper support plane 18 is arranged below the open lower ends of the upper compartment sections 13 of the alignment compartments 11. Said stationary lower support plane 17 extends in the circumferential direction from below the first alignment drop site 19 to a transfer site 49 where the transfer device 30 interacts with the conveyor device 10. Said stationary upper support plane 18 extends in the circumferential direction from below the second alignment drop site 20 to the mentioned transfer site 49.

Figure 8:
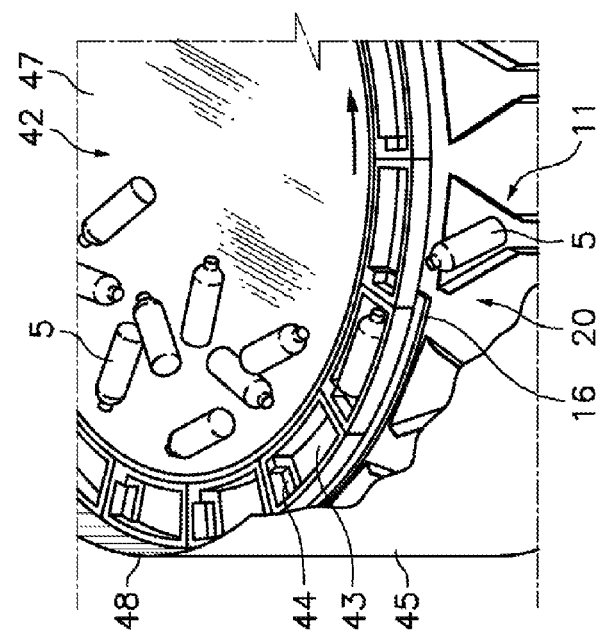
FIG. 8 is a partial perspective view with cut-outs of the apparatus for positioning containers of FIG. 1.
Figure 7:
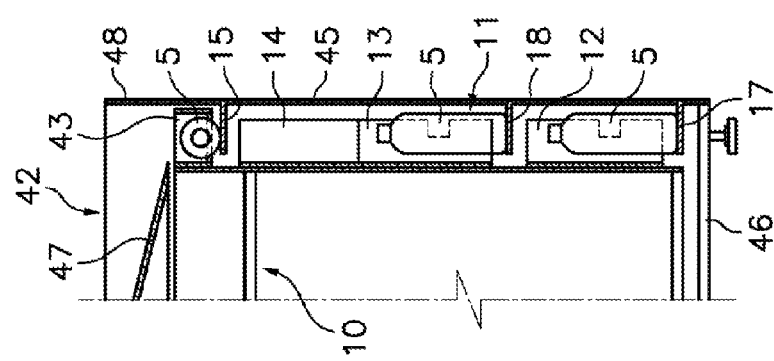
FIG. 7 is a partial cross-section view of the apparatus for positioning containers of FIG. 1.

As shown in FIGS. 7 and 8, a receptacle 42 configured for housing a plurality of bulk, randomly scrambled containers 5 is arranged above the conveyor device 10. This receptacle 42 has a bottom 47 defining a conical upper surface and a circumferential side wall 48. There is a gap between a peripheral edge of the bottom 47 and the circumferential side wall 48 that is sized for allowing passage of containers 5 oriented in the mentioned direction tangent to the forward movement direction or circumferential direction. The bottom 47 can be stationary or can rotate with the conveyor device 10, or it can even rotate in a direction opposite the rotating direction of the conveyor device 10.

A stationary circumferential outer wall 45 externally closing the alignment compartments 11 surrounds the conveyor device 10. This circumferential outer wall 45 is fixed to a fixed structure 46, whereas the first and second positioning support planes 15, 16, the lower and upper support planes 17, 18, and the circumferential side wall 48 are fixed to the circumferential outer wall 45.

The receptacle 42 and the first and second alignment drop sites 19, 20 are part of the mentioned loading device whereby the containers 5 are individually placed upright on their bases inside the lower and upper compartment sections 12, 13 of the alignment compartments 11.

During operation of the apparatus, containers 5 which are housed in the peripheral cavities 43 as the conveyor device 10 turns are conveyed by sliding over the first and second positioning support planes 15, 16 until they fall through the corresponding first and second alignment drop sites 19, 20 inside the inlet sections 14 and lower and upper compartment sections 13, 14 of the alignment compartments 11.

The containers 5 falling through the first alignment drop site 19 are housed upright on their bases inside the lower compartment sections 12 and are driven by lower compartment sections 12 sliding over the lower support plane 17 to the transfer site 49, and the containers 5 that have fallen through the second alignment drop site 20 are housed upright on their bases inside the upper compartment sections 13 and are driven by the upper compartment sections 13 sliding over the upper support plane 18 to the transfer site 49, such that all the lower and upper compartment sections 12, 13 of the alignment compartments 11 reach the transfer site 49 carrying respective containers 5.

It must be pointed out that for the purpose of the present invention, the conveyor device 10, the fixed structure 46 and the loading device can have a configuration or operating principle different from that described above and illustrated in the drawings, provided that the conveyor device has alignment compartments 11 on its periphery having lower and upper compartment sections 12, 13, and provided that the loading device comprises means for placing the containers upright in the lower and upper compartment sections 12, 13. For example, the conveyor device can be a carrousel device, describing a path other than a circular path, instead of a rotating structure, and the loading device can be designed to individually and selectively introduce a container in each of the peripheral cavities of the conveyor device.

The transfer wheel 31 of the transfer device 30 is rotational about a vertical axis and has a number n of upper transfer recesses 34 and a double number 2n of lower transfer recesses 33 distributed at regular intervals along its periphery. The upper transfer recesses 34 are separated from one another by a distance in a circumferential direction equivalent to the pitch P and the lower transfer recesses 33 are separated from one another by a distance in a circumferential direction equivalent to a half pitch P/2, which is one half of the pitch P. Each of the upper transfer recesses 34 is vertically aligned with one of the lower transfer recesses 33. Each of the lower and upper transfer recesses 33, 34 is configured for receiving a container 5.

The transfer wheel 31 rotates in an inverse direction with respect to the rotating direction of the conveyor device 10 and at the same tangential speed as the conveyor device 10. As the transfer wheel 31 rotates, the lower and upper transfer recesses 33, 34 move in a circular path substantially tangent to the circular path of the lower and upper compartment sections 12, 13 of the conveyor device 10, respectively, and all the upper transfer recesses 34 as well as alternating lower transfer recesses 33 aligned with same coincide with the upper and lower compartment sections 13, 12, respectively, of the conveyor device 10 in the transfer site 49, which is the point of tangency of both circular paths.

The intercalation wheel 32 is rotational about a vertical axis and has an uneven number m of lower intercalation recesses 35 and an equal uneven number m of upper intercalation recesses 36 distributed at regular intervals along its periphery. Both the lower intercalation recesses 35 and the upper intercalation recesses 36 are separated from one another by a distance in a circumferential direction equivalent to the mentioned half pitch P/2. The lower and upper intercalation recesses 35, 36 are aligned with one another in a vertical direction. Each of the lower and upper intercalation recesses 35, 36 is configured for receiving a container 5.

The intercalation wheel 32 rotates in an inverse direction with respect to the rotating direction of the transfer wheel 31 and at the same tangential speed as the transfer wheel 31. As the intercalation wheel 32 rotates, the lower and upper intercalation recesses 35, 36 move in a circular path which is substantially tangent to the circular path of the lower and upper transfer recesses 33, 34 of the transfer wheel 31, respectively.

Each of the upper intercalation recesses 36 of the intercalation wheel 32, in accordance with the uneven number m thereof, coincides in alternating turns with one of the upper transfer recesses 34 of the transfer wheel 31 in a transfer site, which is the point of tangency of both circular paths, and each of the lower intercalation recesses 35, in accordance with the uneven number m thereof, coincides in the transfer site with one of the lower transfer recesses 33 of the transfer wheel 31, intercalated between two of the upper transfer recesses 34 of the transfer wheel 31, carrying containers transferred from the lower compartment sections 12 of the conveyor device.

The transfer device 30 further comprises first, second and third stationary lower deflecting elements 51, 52, 56, first and second stationary upper deflecting elements 53, 54, and an intercalation drop site 55.

The first lower deflecting element 51 is arranged in a position interfering with the circular path of the lower compartment sections 12 of the conveyor device 10 in the transfer site 49 such that it extracts containers 5 from the lower compartment sections 12 of the conveyor device 10 and transfers them to alternating lower transfer recesses 33 of the transfer wheel 31.

Therefore, in accordance with a double number 2n of lower transfer recesses 33, the transfer wheel 31 initially has empty alternating lower transfer recesses 33.

Figure 1:
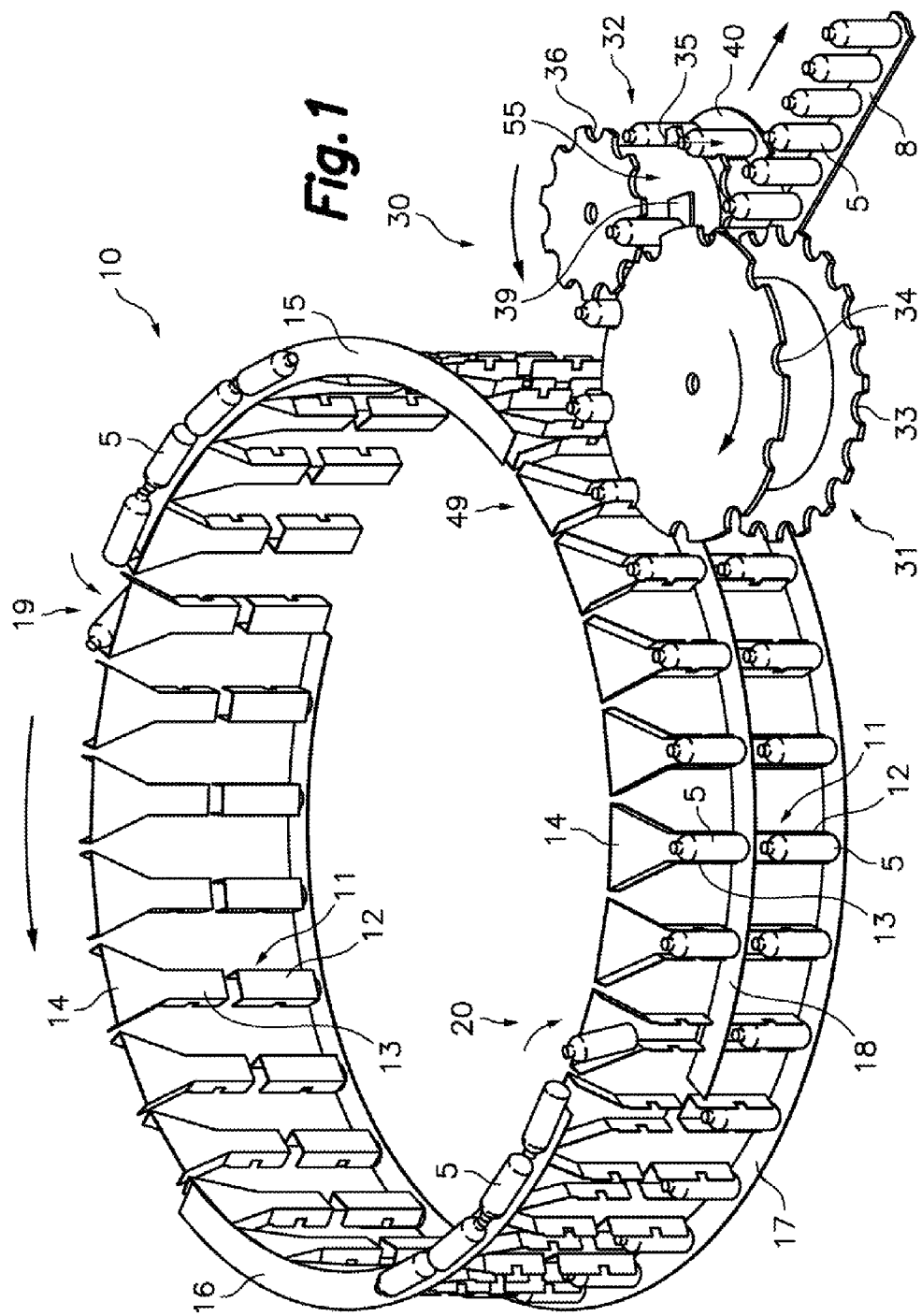
FIG. 1 is a schematic perspective view of an apparatus for positioning containers according to an embodiment of the present invention.
Figure 3:
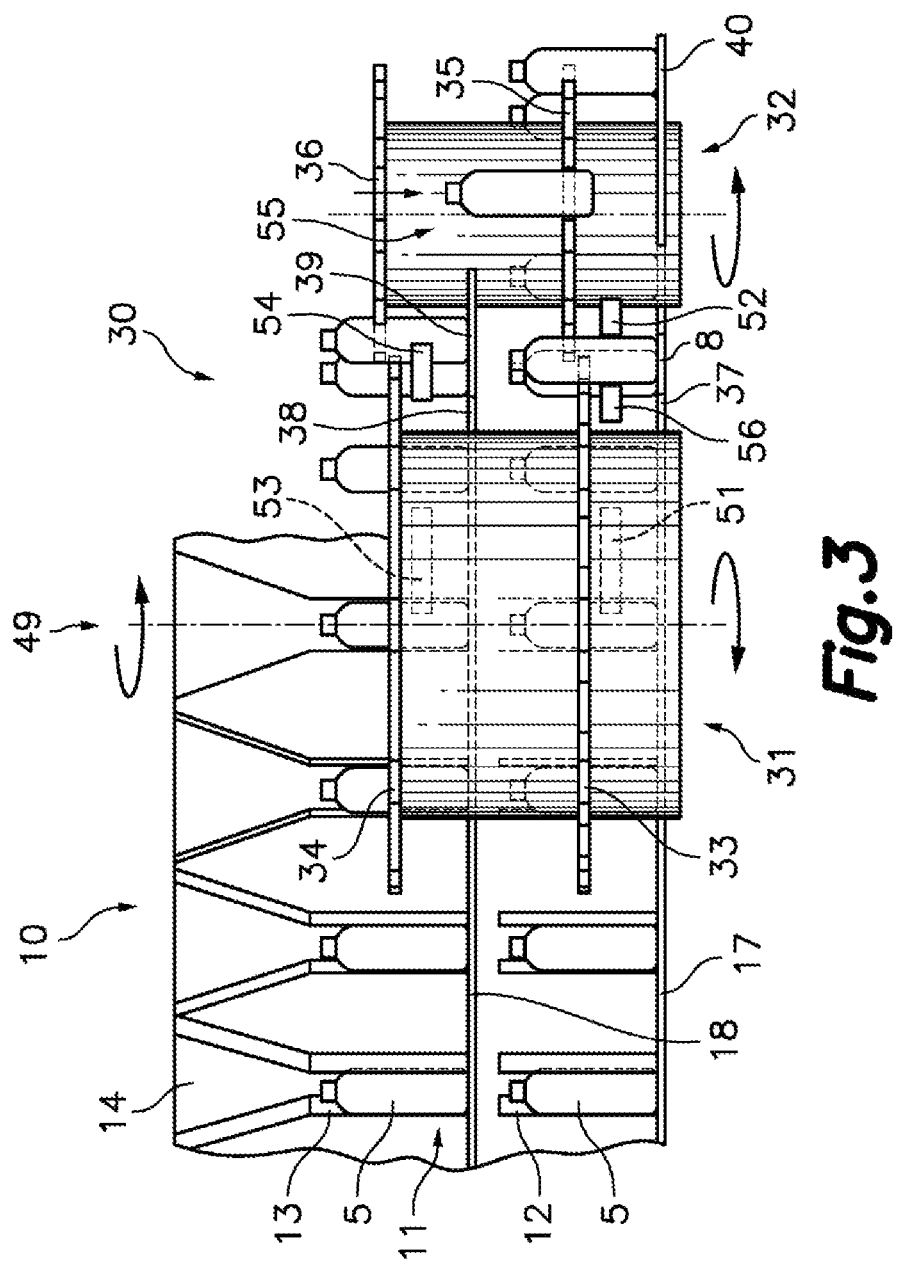
FIG. 3 is a partial schematic front elevational view of the transfer device of the apparatus for positioning containers of FIG. 1.

The transfer wheel 31 transfers the containers 5 placed upright on their base sliding over a stationary lower transfer support plane 37 extending in a circumferential direction from the transfer site 49 to an output conveyor 8, which in the embodiment shown in FIGS. 1, 2 and 3, comprises an endless belt the path of which has its start at the point of tangency between circular paths of the lower transfer recesses 33 of the transfer wheel 31 and of the lower intercalation recesses 35 of the intercalation wheel 32, and is tangent to both circular paths.

The first upper deflecting element 53 is arranged in a position interfering with the circular path of the upper compartment sections 13 of the conveyor device 10 in the transfer site 49, such that it extracts containers 5 from the upper compartment sections 13 of the conveyor device 10 and transfers them to the upper transfer recesses 34 of the transfer wheel 31. The transfer wheel 31 transfers the containers 5 placed upright on their base sliding over a stationary upper transfer support plane 38 extending in a circumferential direction from the transfer site 49 to the upper intercalation recesses 36 of the intercalation wheel 32.

The second upper deflecting element 54 is arranged in a position interfering with the circular path of the upper transfer recesses 34 of the transfer wheel 31 in the point of tangency between circular paths of the upper transfer recesses 34 of the transfer wheel 31 and of the upper intercalation recesses 36 of the intercalation wheel 32, such that it extracts containers 5 from the upper transfer recesses 34 of the transfer wheel 31 and transfers them to the upper intercalation recesses 36 of the intercalation wheel 32.

The intercalation wheel 32 transfers the containers 5 placed upright on their base sliding over a stationary upper intercalation support plane 39 extending in a circumferential direction from the upper transfer recesses 34 of the transfer wheel 31 to a final end of the upper transfer support plane 38. After this final end, the absence of the upper transfer support plane 38 provides the intercalation drop site 55, through which the containers 5 fall from the upper intercalation recesses 36 to the lower intercalation recesses 35 of the intercalation wheel 32 over the course of one turn thereof.

After the intercalation drop site 55, the lower intercalation recesses 35 of the intercalation wheel 32 transfer the containers 5 placed upright on their base sliding over a stationary lower intercalation support plane 40 extending in a circumferential direction from said intercalation drop site 55 to the lower transfer recesses 33 of the transfer wheel 31.

The second lower deflecting element 52 is arranged in a position interfering with the circular path of the lower intercalation recesses 35 of the intercalation wheel 32, such that it extracts containers 5 from the lower intercalation recesses 35 of the intercalation wheel 32 and transfers them to the initially empty alternating lower transfer recesses 33 of the transfer wheel 31 at the point of tangency between circular paths of the lower transfer recesses 33 of the transfer wheel 31 and of the lower intercalation recesses 35 of the intercalation wheel 32. Therefore, the intercalation wheel 32 returns containers 5 to the transfer wheel 31 in intercalated positions between positions of containers 5 previously transferred to the lower transfer recesses 33 of the transfer wheel 31 from the lower compartment sections 12 of the conveyor device 10.

The third lower deflecting element 56 is arranged in a position interfering with the circular path of the lower transfer recesses 33 of the transfer wheel 31, such that it extracts containers 5 from the lower transfer recesses 33 of the transfer wheel 31 and transfers them to the output conveyor 8, with the particularity that in the output conveyor 8 the containers 5 are separated from one another by a distance equivalent to the half pitch P/2 (FIG. 2). After that point, the output conveyor 8 transfers the containers 5 placed upright on their base in a row.

Figure 4:
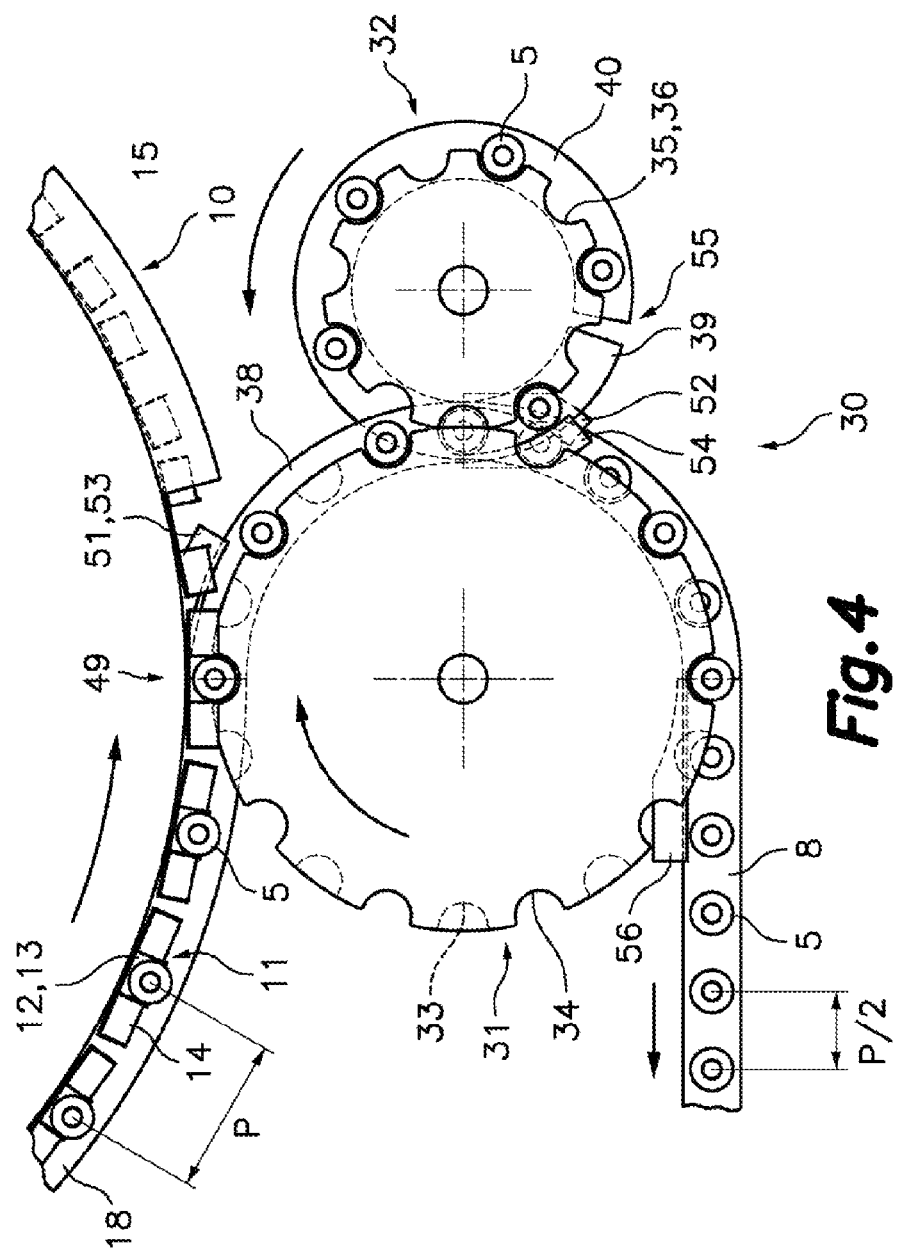
FIG. 4 is a partial schematic plan view showing a transfer device of an apparatus for positioning containers according to another embodiment of the present invention.

FIG. 4 shows an alternative embodiment that only differs from the embodiment described above in relation to FIGS. 1, 2, 3, 7 and 8 in that the path of the output conveyor 8 is tangent to the circular path of the lower transfer recesses 33 of the transfer wheel 31 but not to the circular path of the lower intercalation recesses 35 of the intercalation wheel 31. In this embodiment, the third lower deflecting element 56 is arranged in a position interfering with the circular path of the lower transfer recesses 33 of the transfer wheel 31 downstream of the second lower deflecting element 52, such that it extracts containers 5 from the lower transfer recesses 33 of the transfer wheel 31 and transfers them to the output conveyor 8, where the containers 5 are separated from one another by a distance equivalent to the half pitch P/2 (FIG. 4).

In another alternative embodiment that is not shown, the output conveyor 8 comprises a conventional output wheel instead of a conveyor belt. This output wheel is rotational about a vertical axis and has a number of delivery recesses distributed at regular intervals along its periphery and separated from one another by a distance in a circumferential direction equivalent to the half pitch P/2. As the delivery wheel rotates, it moves the delivery recesses in a circular path tangent to the circular path of the lower transfer recesses 33 of the transfer wheel 31.

Figure 5:
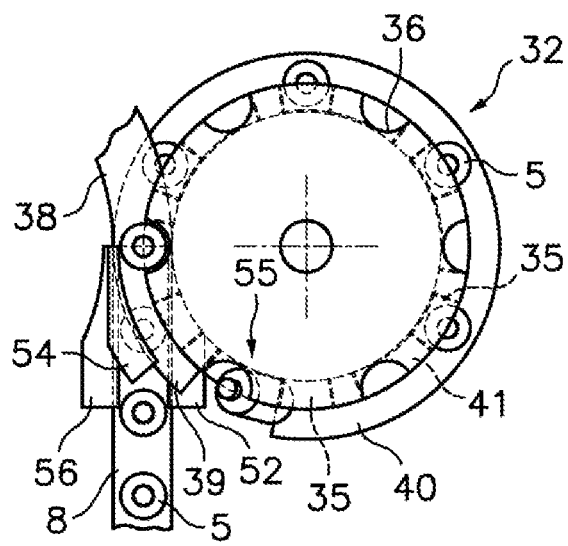
FIG. 5 is a partial schematic plan view showing an intercalation wheel belonging to a transfer device of an apparatus for positioning containers according to yet another embodiment of the present invention.
Figure 6:
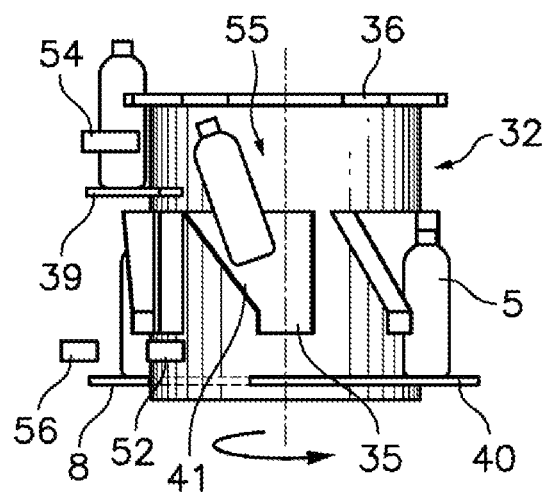
FIG. 6 is a partial schematic front elevational view of the intercalation wheel of the apparatus for positioning containers of FIG. 5.

FIGS. 5 and 6 show an intercalation wheel 32 according to an alternative embodiment configured for replacing the intercalation wheel 32 described above in relation to FIGS. 1 to 4.

The intercalation wheel 32 of FIGS. 5 and 6 has an even number p of lower intercalation recesses 35 and an equal even number p of upper intercalation recesses 36 distributed at regular intervals along its periphery and separated from one another by a distance in a circumferential direction equivalent to the pitch P. In this case, the lower intercalation recesses 35 are shifted with respect to the upper intercalation recesses 36 a distance in a circumferential direction equivalent to the half pitch P/2.

The intercalation wheel 32 of FIGS. 5 and 6 further comprises a plurality of drop chutes 41, each of which has an upper opening configured and arranged for receiving one of the containers 5 falling from one of the upper intercalation recesses 36 through the intercalation drop site 55 and an inclined surface leading the falling container 5 to one of the lower intercalation recesses 35. The second lower deflecting element 52 then extracts containers 5 from the lower intercalation recesses 35 of the intercalation wheel 32 and transfers them to initially empty alternating lower transfer recesses 33 of the transfer wheel 31.

The invention claimed is:

1. An apparatus for positioning containers, comprising:
   a conveyor device having alignment compartments moving along a closed circuit, where each alignment compartment comprises a lower compartment section and an upper compartment section vertically aligned with one another, and where each lower and upper compartment section is sized for housing a container upright on its base; and a loading device placing containers upright inside lower and upper compartment sections of the alignment compartments;

characterized in that it comprises:

a rotating transfer wheel having on its periphery lower transfer recesses and upper transfer recesses receiving containers from the lower and upper compartment sections, respectively, of the alignment compartments of the conveyor device; and an intercalation device receiving the containers from said upper transfer recesses and transferring them to said lower transfer recesses in intercalated positions between the containers previously transferred to the lower transfer recesses of the transfer wheel, from where all the containers are transferred to an output conveyor;

deflecting elements being arranged which transfer the containers from the conveyor device to the transfer wheel, from the transfer wheel to the intercalation device, from the intercalation device to the transfer wheel, and from the transfer wheel to said output conveyor.

2. The apparatus for positioning containers according to claim 1, characterized in that said intercalation device comprises a rotating intercalation wheel having on its periphery upper intercalation recesses receiving containers from said upper transfer recesses of the transfer wheel, lower intercalation recesses, and an intercalation drop site through which the containers fall from the upper intercalation recesses into the lower intercalation recesses over the course of one turn.

3. The apparatus for positioning containers according to claim 2, characterized in that the alignment compartments are distributed at regular intervals along a periphery of the conveyor device and separated from one another by a distance in a perimetric direction equivalent to one pitch, and the transfer wheel has a number n of upper transfer recesses distributed at regular intervals along its periphery and separated from one another by a distance in a circumferential direction equivalent to said pitch and a double number 2n of lower transfer recesses distributed at regular intervals along its periphery and separated from one another by a distance in a circumferential direction equivalent to a half pitch which is one half of the pitch, where each of the upper transfer recesses is vertically aligned with one of the lower transfer recesses.

4. The apparatus for positioning containers according to claim 3, characterized in that the intercalation wheel has an uneven number m of lower intercalation recesses and an equal uneven number m of upper intercalation recesses distributed at regular intervals along its periphery and separated from one another by a distance in a circumferential direction equivalent to said half pitch, where each of the upper intercalation recesses is vertically aligned with one of the lower intercalation recesses.

5. The apparatus for positioning containers according to claim 3, characterized in that the intercalation wheel has an even number p of lower intercalation recesses and an equal even number p of upper intercalation recesses distributed at regular intervals along its periphery and separated from one another by a distance in a circumferential direction equivalent to the pitch, where the lower intercalation recesses are shifted with respect to the upper intercalation recesses a distance in a circumferential direction equivalent to said half pitch.

6. The apparatus for positioning containers according to claim 5, characterized in that the intercalation wheel comprises a plurality of drop chutes, each of which has an upper opening receiving one of the containers falling from one of the upper intercalation recesses through said intercalation drop site and an inclined surface leading the falling container to one of the lower intercalation recesses.

7. The apparatus for positioning containers according to claim 1, characterized in that the transfer wheel transfers the containers placed upright on their base sliding over a stationary lower transfer support plane from the lower sections of the alignment compartments of the conveyor device to the output conveyor.

8. The apparatus for positioning containers according to claim 1, characterized in that the transfer wheel transfers the containers placed upright on their base sliding over a stationary upper transfer support plane from the upper sections of the alignment compartments of the conveyor device to the upper intercalation recesses of the intercalation wheel.

9. The apparatus for positioning containers according to claim 2, characterized in that the intercalation wheel transfers the containers placed upright on their base sliding over a stationary upper intercalation support plane from the upper transfer recesses of the transfer wheel to said intercalation drop site, the intercalation drop site being provided by an absence of said upper transfer support plane from a final end thereof.

10. The apparatus for positioning containers according to claim 2, characterized in that the intercalation wheel transfers the containers placed upright on their base sliding over a stationary lower intercalation support plane from said intercalation drop site to the lower transfer recesses of the transfer wheel.

11. The apparatus for positioning containers according to claim 1, characterized in that the output conveyor transfers the containers placed upright on their base in a row in a path which is substantially tangent to said circular path of the lower transfer recesses of the transfer wheel.

12. The apparatus for positioning containers according to claim 2, characterized in that the output conveyor transfers the containers placed upright on their base in a row in a path which is substantially tangent to said circular path of the lower transfer recesses of the transfer wheel and substantially tangent to said circular path of the lower intercalation recesses of the intercalation wheel in a point of tangency between the circular paths of the lower transfer recesses of the transfer wheel and of the lower intercalation recesses of the intercalation wheel.

13. The apparatus for positioning containers according to claim 4, characterized in that the transfer wheel transfers the containers placed upright on their base sliding over a stationary lower transfer support plane from the lower sections of the alignment compartments of the conveyor device to the output conveyor.

14. The apparatus for positioning containers according to claim 5, characterized in that the transfer wheel transfers the containers placed upright on their base sliding over a stationary lower transfer support plane from the lower sections of the alignment compartments of the conveyor device to the output conveyor.

15. The apparatus for positioning containers according to claim 4, characterized in that the transfer wheel transfers the containers placed upright on their base sliding over a stationary upper transfer support plane from the upper sections of the alignment compartments of the conveyor device to the upper intercalation recesses of the intercalation wheel.

16. The apparatus for positioning containers according to claim 6, characterized in that the transfer wheel transfers the containers placed upright on their base sliding over a stationary upper transfer support plane from the upper sections of the alignment compartments of the conveyor device to the upper intercalation recesses of the intercalation wheel.

17. The apparatus for positioning containers according to claim 4, characterized in that the intercalation wheel transfers the containers placed upright on their base sliding over a stationary upper intercalation support plane from the upper transfer recesses of the transfer wheel to said intercalation drop site, the intercalation drop site being provided by an absence of said upper transfer support plane from a final end thereof.

18. The apparatus for positioning containers according to claim 6, characterized in that the intercalation wheel transfers the containers placed upright on their base sliding over a stationary upper intercalation support plane from the upper transfer recesses of the transfer wheel to said intercalation drop site, the intercalation drop site being provided by an absence of said upper transfer support plane from a final end thereof.

19. The apparatus for positioning containers according to claim 4, characterized in that the intercalation wheel transfers the containers placed upright on their base sliding over a stationary lower intercalation support plane from said intercalation drop site to the lower transfer recesses of the transfer wheel.

20. The apparatus for positioning containers according to claim 6, characterized in that the intercalation wheel transfers the containers placed upright on their base sliding over a stationary lower intercalation support plane from said intercalation drop site to the lower transfer recesses of the transfer wheel.

\* \* \* \* \*